United States Patent [19]
Tanaka

[11] Patent Number: 4,706,137
[45] Date of Patent: Nov. 10, 1987

[54] HEAD SWITCHING SIGNAL PRODUCING CIRCUIT WITH COMPENSATION OF A PHASE ERROR DUE TO THE POSITIONING OF A ROTARY DRUM HEAD AND A ROTATIONAL PHASE DETECTOR

[75] Inventor: Hidenori Tanaka, Yokohama, Japan
[73] Assignee: Victor Company of Japan, Ltd., Japan
[21] Appl. No.: 863,090
[22] Filed: May 14, 1986
[30] Foreign Application Priority Data
May 20, 1985 [JP] Japan .............................. 60-74492[U]
[51] Int. Cl.$^4$ ............................................. G11B 15/14
[52] U.S. Cl. ....................................... 360/64; 360/61; 360/70
[58] Field of Search ....................... 360/61, 64, 70, 71, 360/72.1; 358/335

[56] References Cited
U.S. PATENT DOCUMENTS

| | | | |
|---|---|---|---|
| 3,994,019 | 11/1976 | Sagishima et al. | 360/64 X |
| 4,021,857 | 5/1977 | Tanimura | 360/64 X |
| 4,040,101 | 8/1977 | Zoellner et al. | 360/64 |
| 4,361,856 | 11/1982 | Okamoto | 360/64 |
| 4,614,985 | 9/1986 | Tsuruta | 360/64 |
| 4,626,932 | 12/1986 | Müller | 360/64 X |
| 4,636,875 | 1/1987 | Scholz | 360/64 X |

FOREIGN PATENT DOCUMENTS 0138457  4/1985  European Pat. Off. .

Primary Examiner—Raymond F. Cardillo
Assistant Examiner—Wayne Young
Attorney, Agent, or Firm—Andrus, Sceales, Starke & Sawall

[57] ABSTRACT

A head swtiching signal producing circuit produces a head switching signal by electrically compensating for a phase error on a rotational plane of a rotary drum between a mounting position of a rotary head on the rotary drum and a mounting position of a rotational phase detector which is used to detect a rotational phase of the rotary drum, so as to produce an accurate head switching signal without controlling the mounting position of the rotational phase detector within a small tolerance.

6 Claims, 5 Drawing Figures

HEAD SWITCHING SIGNAL PRODUCING CIRCUIT WITH COMPENSATION OF A PHASE ERROR DUE TO THE POSITIONING OF A ROTARY DRUM HEAD AND A ROTATIONAL PHASE DETECTOR

BACKGROUND OF THE INVENTION

The present invention generally relates to head switching signal producing circuits, and more particularly to a head switching signal producing circuit for producing a head switching signal which is used to switch over reproduced signals from rotary heads of a helical scan type magnetic recording and reproducing apparatus so as to obtain a continuous reproduced signal which time-sequentially comprises the reproduced signals from the rotary heads.

In a helical scan type magnetic recording and reproducing apparatus (hereinafter referred to as a video tape recorder or simply VTR), a plurality of rotary heads successively scan a magnetic tape. Hence, in order to prevent noise from a rotary head which is not scanning the magnetic tape from mixing into a reproduced signal from a rotary head which is actually scanning the magnetic tape, the reproduced signals successively obtained from the rotary heads are supplied to a switching circuit and the switching of this switching circuit is controlled responsive to a head switching signal so that a continuous reproduced signal which time-sequentially comprises the reproduced signals from the rotary heads is produced from the switching circuit, as is well known. As methods of producing the head switching signal, there are basically two conventional methods.

According to a first conventional method, a rotational phase detector is used to detect a rotational phase of a rotary drum which is mounted with the rotary heads. Generally, the rotary drum is connected to a rotary shaft of a motor which rotates the rotary drum. According to a first conventional method, a rotary plate is fixed to the rotary shaft of the motor, and a number of magnets corresponding to the number of rotary heads are provided on the rotary plate. A magnetic head is located at the same height position as the rotary plate so that the magnetic head confronts the magnets on the rotary plate which rotates unitarily with the rotary drum. The magnetic head which constitutes a rotational phase detector together with the magnets on the rotary plate produces a pulse every time one of the magnets on the rotary plate passes the position confronting the magnetic head. Output pulses PG of the magnetic head, that is, the rotational phase detector, are supplied to a delay circuit wherein the timing of the pulses is adjusted to each of the rotary heads, and the head switching signal is produced from an output signal of the delay circuit.

However, according to the first conventional method, it is necessary to provide on the rotary plate a number of magnets corresponding to the number of rotary heads, and mounting positions of the magnets on the rotary plate must be adjusted with respect to the corresponding rotary heads on the rotary drum. As a result, there are problems in that it takes time to adjust the mounting positions of the magnets on the rotary plate with respect to the corresponding rotary heads with a high precision, and it is difficult to obtain an accurate head switching signal.

On the other hand, a second conventional method uses a frequency generator in addition to the rotational phase detector of the first conventional method. The frequency generator is coupled to the motor which rotates the rotary drum and generates pulses FG having a period dependent on a rotational speed of the rotary drum. Generally, the output pulses FG of the frequency generator are used to control the rotational speed of the rotary drum. The output pulses FG of the frequency generator are indicative of rotary positions of the rotary drum. Hence, it is possible to produce a head switching signal for each of the rotary heads by counting the output pulses FG of the frequency generator with reference to the output pulses PG of the rotational phase detector.

According to the second conventional method, an N-count counter counts the output pulses FG of the frequency generator, and this counter is reset by the output pulses PG of the rotational phase detector indicative of a reference phase. It is possible to detect the rotational phase of the rotary drum from a counted value in the counter, but problems occur depending on timings of the output pulses PG of the rotational phase detector and the output pulses PG of the frequency generator. For example, when the timing with which the pulses FG are counted in the counter and the timing with which the counter is reset by the pulses PG coincide or approximately coincide and the timings with which the pulses FG and pG are supplied to the counter become inverted due to change with time or the like, a timing error of one period of the pulses FG occurs in the head switching signal because the head switching signal is produced when the counted value in the counter reaches a predetermined value. For this reason, the mounting positions of the rotational phase detector and the frequency generator with respect to the rotary heads are appropriately controlled so that the timing error does not occur.

The control of the mounting positions of the rotational phase detector and the frequency generator is relatively easy when the number of pulses FG generated from the frequency generator in one revolution of the rotary drum is small. However, when the number of pulses FG generated from the frequency generator in one revolution of the rotary drum is made large in order to improve the accuracy of the rotational speed control described before, one pulse out of the pulses FG corresponds to a small rotary angle of the rotary drum, and there is a problem in that it is extremely difficult to mount the rotational phase detector within a tolerance of such a small rotary angle.

SUMMARY OF THE INVENTION

Accordingly, it is a general object of the present invention to provide a novel and useful head switching signal producing circuit in which the problems described heretofore are eliminated.

Another and more specific object of the present invention is to provide a head switching signal producing circuit which produces a head switching signal by electrically compensating for a phase error on a rotational plane of a rotary drum between a mounting position of a rotary head on the rotary drum and a mounting position of a rotational phase detector which is used to detect a rotational phase of the rotary drum. According to the head switching signal producing circuit of the present invention, it is possible to produce an accurate head switching signal without the need to control the mounting position of the rotational phase detector within a small tolerance, and the adjustment of the mounting position of the rotational phase detector is extremely simple compared to the conventional methods described before.

Still another object of the present invention is to provide a head switching signal producing circuit which produces a head switching signal used to switch over signals reproduced from a magnetic tape by at least one pair of rotary heads which are mounted at diametrical positions on a rotational plane of a rotary body, where the rotary body is wrapped obliquely with the magnetic tape on an outer periphery thereof for an angular range greater than 180° and signals from the rotary heads are switched over so that the signal from one of the rotary heads which is scanning the magnetic tape is selectively outputted. The head switching signal producing circuit according to the present invention comprises a first pulse generator for generating a first pulse per one revolution of the rotary body, a second pulse generator for generating a constant number of second pulses per one revolution of the rotary body, where the second pulses have a period dependent on a rotational speed of the rotary body, a first counter reset by the first pulse for counting the second pulses, a second counter reset by an output of the first counter for every one revolution of the rotary body for counting clock pulses for a first time period from a time when the first pulse is received to a time immediately thereafter when one of the second pulses is received by the first counter, and for resuming a counting operation when a counted value in the first counter becomes a predetermined value so as to produce an overflow signal when the clock pulses are counted for a second time period, where the second time period is the first time period less than one period of the second pulses, a memory for storing a counted value in the second counter during the first time period, where the counted value in the memory is read out and loaded into the second counter before the counted value in the first counter becomes the predetermined value, a delay circuit for producing a signal which is delayed by a specific time from a time when the first pulse or the overflow signal is received, and an output circuit for producing as the head switching signal a signal having a polarity thereof inverted every time an output signal of the delay circuit is received. According to the head switching signal producing circuit of the present invention, it is possible to discriminate the rotational phase of the rotary body from the counted value in the first counter, and it is thus possible to invert the polarity of the head switching signal at a predetermined phase address of the rotary body. In addition, since the overflow signal is supplied to the delay circuit at the time when the clock pulses are counted for the second time period, the phase relationship between the second pulses and the output signal of the delay circuit is always constant. Therefore, it is possible to produce a head switching signal having a polarity which is accurately inverted for every one-half revolution of the rotary body, even when the phase relationship of the first and second pulses is arbitrarily selected. For this reason, it is unnecessary to control the mounting positions of the first and second pulse generators. In addition, since the first pulse generator simply needs to produce the first pulse for every one revolution of the rotary body, it is sufficient to provide only one magnet on a rotary plate which rotates unitarily with the rotary body. This means that it is only necessary to adjust the mounting position of this one magnet with respect to the rotary heads, and the time it takes to perform the adjustment is considerably reduced compared to the conventional method.

Other objects and further features of the present invention will be apparent from the following detailed description when read in conjunction with the accompanying drawings.

DETAILED DESCRIPTION

Figure 1:
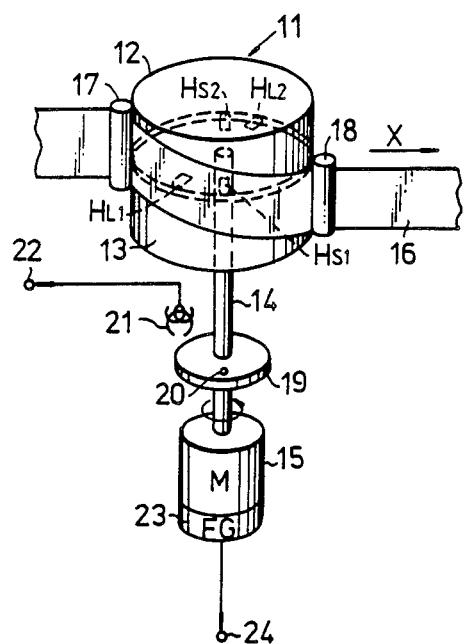
FIG. 1 is a perspective view generally showing a rotary drum and peripheral parts thereof.

FIG. 1 generally shows a rotary drum of a VTR and peripheral parts thereof. A drum structure 11 comprises an upper rotary drum 12 and a lower stationary drum 13. The rotary drum 12 is fixed to a rotary shaft 14 of a motor 15. As will be described later on in the present specification, four rotary heads HS1, HS2, HL1 and HL2 are mounted on the rotary drum 12 with a predetermined positional relationship. A magnetic tape 16 is wrapped obliquely around an outer periphery of the drum structure 11 over an angular range slightly greater than 180° under guidance of guide poles 17 and 18, and is moved in a direction X by a known driving means (not shown) in a normal forward reproduction mode of the VTR. A rotary plate 19 is fixed to the rotary shaft 14 and is unitarily rotatable with the rotary drum 12. A magnet 20 is mounted on the rotary plate 19 at a position aligned to the rotary head HS1 on the rotary drum 12. A magnetic head 21 is positioned at the same height position as the rotary plate 19 so as to confront the rotary plate 19, and produces a pulse every time the magnet 20 on the rotary plate 19 passes the position confronting the magnetic head 21. Hence, the magnetic head 21 produces one pulse in one revolution of the rotary drum 12, and output pulses of the magnetic head 21 are supplied to an output terminal 22. The magnetic head 21 and the magnet 20 constitute a rotational phase detector. A frequency generator 23 is coupled to the motor 15 and generates pulses having a period dependent on a rotational speed of the motor 15. The output pulses of the frequency generator 23 are supplied to an output terminal 24.

Figure 2:
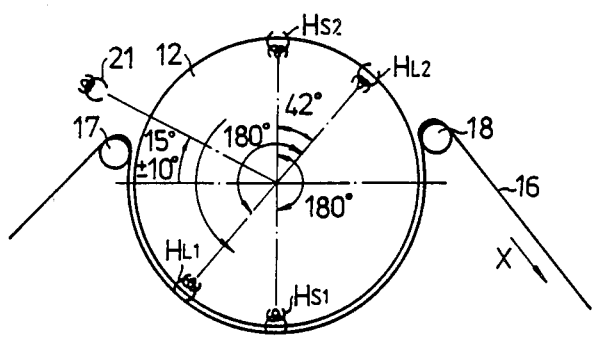
FIG. 2 is a plan view showing mounting position of rotary heads on the rotary drum.

FIG. 2 shows the positional relationships of the rotary heads on the rotary drum 12. The rotary heads HS1 and HS2 are used in a standard mode of the VTR, and are mounted diametrically on the rotary drum 12. On the other hand, the rotary heads HL1 and HL2 are used in a long-time mode of the VTR, and are mounted diametrically on the rotary drum 12. The rotary drum 12 rotates counterclockwise in FIG.2, and the rotary heads HL1 and HL2 are mounted at positions respectively lagging the rotary heads HS1 and HS2 by 42° on a rotational plane of the rotary drum 12. As described before, the magnet 20 is mounted on the rotary plate 19 with the same phase as the rotary head HS1 mounted on the rotary drum 12. For example, the tolerance of the error between the mounting positions of the magnet 20 and the rotary head HS1 is ±3°. The magnetic head 21 is mounted at the same height position as the rotary plate 19 at a position within a range of 15°±10° from a position where the magnetic tape 16 begins to make contact with the rotary drum 12 on the rotational plane of the rotary drum 12.

The rotary drum 12 rotates at a rotational speed of 30 rps, for example, and the rotary heads HS1, HS2, HL1 and HL2 rotate unitarily therewith. Since the magnet 20 passes the position confronting the magnetic head 21 once in one revolution of the rotary drum 12, first pulses a shown in FIG.5(A) are produced from the magnetic head 21.

Figure 3:
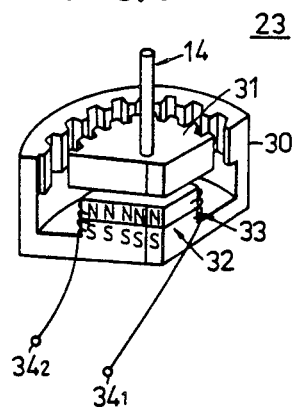
FIG. 3 is a cross sectional view, with a part cut away, showing an example of a frequency generator.

FIG. 3 shows an example of the frequency generator 23. The frequency generator 23 comprises a stator 30 having a concavo-convex inner peripheral wall and a rotor 31 fixed to the rotary shaft 14 of the motor 15. The rotor 31 has concavo-convex outer peripheral wall, and is unitarily rotatable with the rotary shaft 14. A magnet part 32 is provided on a base portion of the stator 30, and a stator winding 33 is provided around the magnet part 32. Ends of the stator winding 33 are coupled to output terminals $34_1$ and $34_2$ which are shown as the output terminal 24 in FIG. 1.

Figure 5:
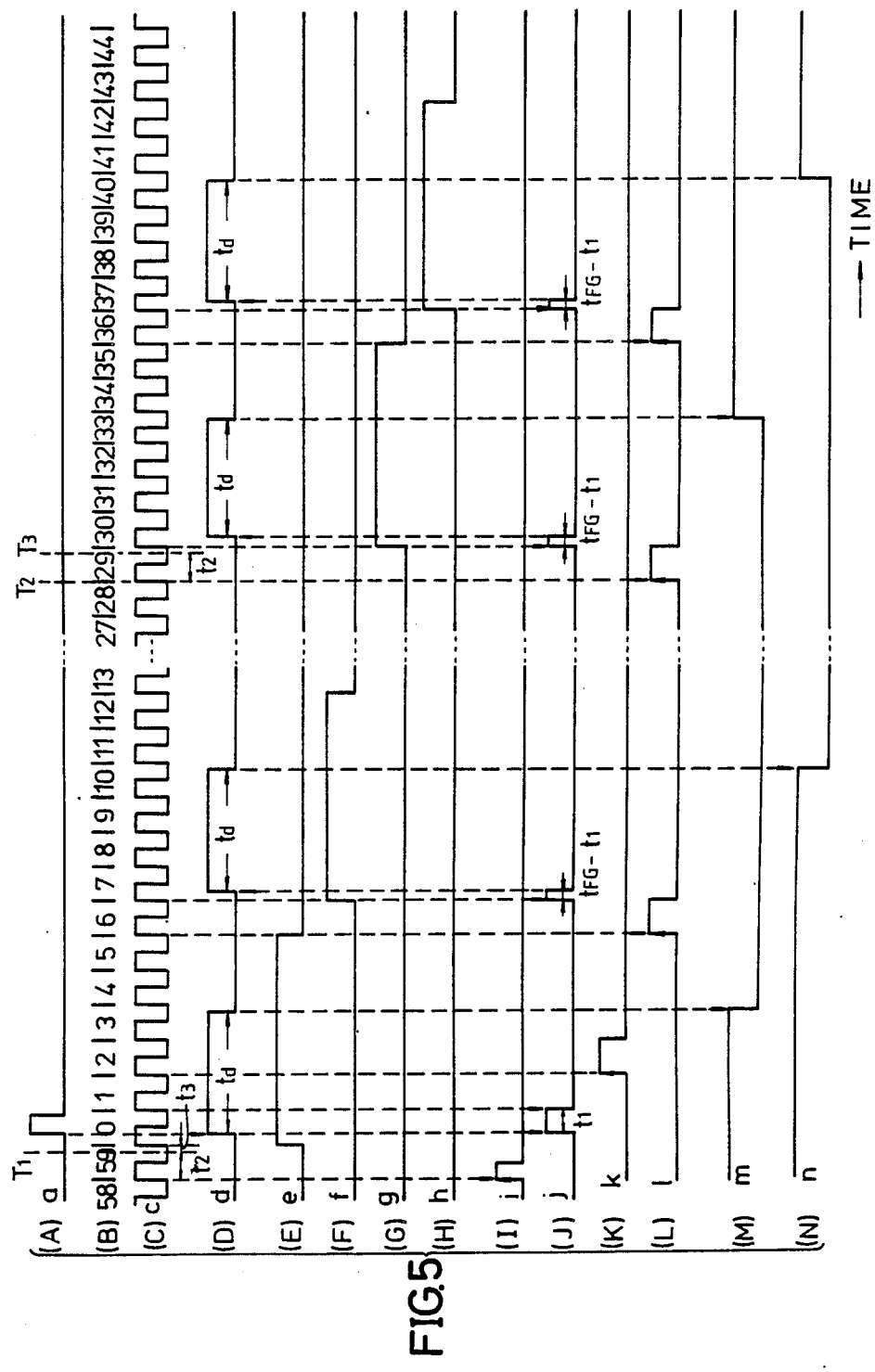
FIGS. 5(A) through 5(N) show signal waveforms for explaining the operation of the circuit system shown in FIG. 4.

The frequency generator 23 generates second pulses c shown in FIG. 5(C). For convenience sake, it will be assumed that the frequency generator 23 generates sixty pulses c in one revolution of the rotary drum 12. The period of the second pulses c changes depending on the rotational speed of the rotary drum 12.

Figure 4:
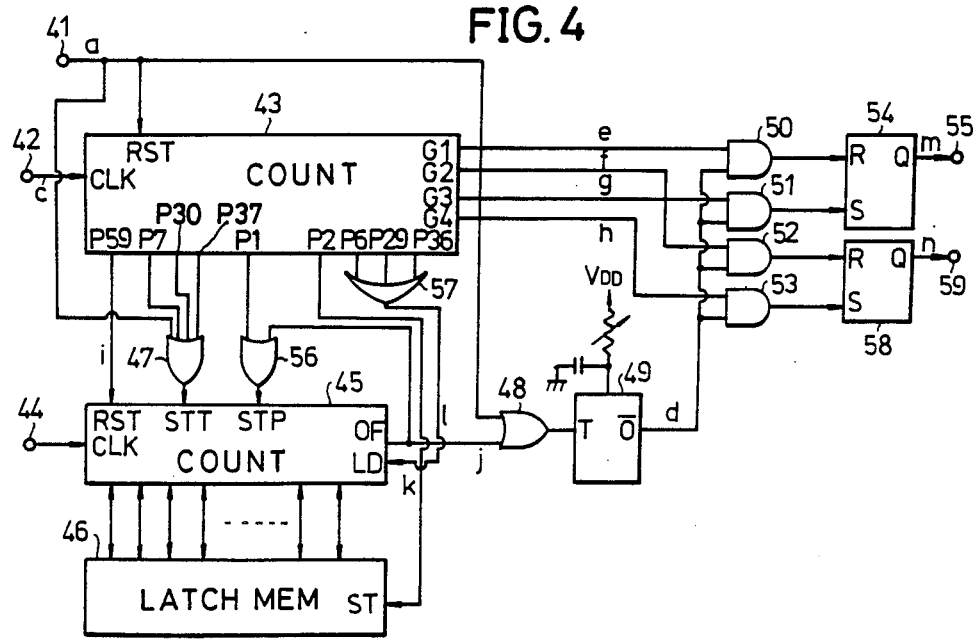
FIG. 4 is a system circuit diagram showing an embodiment of the head switching signal producing circuit according to the present invention.

FIG. 4 shows an embodiment of the head switching signal producing circuit. In FIG. 4, the first pulse a shown in FIG. 5(A) are obtained from the output terminal 22 shown in FIG. 1 and are applied to an input terminal 41. On the other hand, the second pulses c shown in FIG. 5(C) are obtained from the output terminal 24 shown in FIG. 1 (output terminals $34_1$ and $34_2$ shown in FIG. 2) and are applied to an input terminal 42. A 60-count free-run counter 43 is supplied with the first pulses a from the input terminal 42 to a clock terminal CIK thereof, and counts the second pulses c. The first pulses a from the input terminal 41 are supplied to a reset terminal RST of the counter 43 to reset the counter 43. FIG. 5(B) shows counted values in the counter 43.

Clock pulses having a repetition frequency fsc/2 is applied to an input terminal 44 and are supplied to a clock terminal CLK of a compensating counter 45, where fsc=3.579545 MHz. The counter 45 starts to count the clock pulses when a signal is applied to a start terminal STT thereof, and stops the counting operation when a signal is applied to a stop terminal STP thereof. In the present embodiment, the counter 45 is a 10-bit up-down counter designed to produce an overflow signal from an overflow terminal OF thereof when 994 clock pulses are counted in one period $t_{FG}$ (=555.6 μsec) of the second pulses c, where the clock pulses have a period of 0.55873023 μsec. Furthermore, the counter 45 is designed so that a counted value therein is stored in a latch memory 46 and the counted value stored in the latch memory 46 is loaded into the counter 45, as will be described later.

When the counted value in the counter 43 reaches "59", a pulse i shown in FIG. 5(I) is outputted from a terminal P59 of the counter 43, and this pulse i is supplied to a reset terminal RST of the counter 45 to reset the counter 45. In other words, the counter 45 is reset by the output pulse i of the counter 43 for every one revolution of the rotary drum 12. The counted value in the counter 43 becomes "0" when the next pulse c is counted, and the counter 43 is reset when the pulse a shown in FIG. 5(A) is received immediately after the counted value becomes "0". At the same time, the pulse a is passed through an OR circuit 47 and is supplied to the start terminal STT of the counter 45 so as to start the counting operation of the counter 45. The pulse a is also passed through an OR circuit 48 and is supplied to a trigger terminal T of a monostable multivibrator 49 so as to trigger the monostable multivibrator 49 by a rising edge of the pulse a. The monostable multivibrator 49 is a pulse delay circuit for compensating for a mounting phase error between the magnetic head 21 and the rotary heads HS1, HS2, HL1 and HL2. The monostable multivibrator 49 produces a pulse signal d shown in FIG. 5(D) which has a low level after a predetermined time td elapses from the rising edge of the pulse a, that is, from a time when the magnetic head 21 detects the magnet 20. The predetermined time td corresponds to the rotary angle of 15°±10° described before.

Because the counter 43 is reset by the rising edges of the pulses a, the counted value in the counter 43 shown in FIG. 5(B) indicates a rotational phase address of the rotary drum 12 with 6° (=360°/60) intervals by taking as a reference phase a position where the magnet 20 confronts the magnetic head 21. Accordingly, the output pulse signal d of the monostable multivibrator 49 falls within a time period in which the counted value in the counter 43 is "3". The output pulse signal d of the monostable multivibrator 49 is supplied to 2-input AND circuits 50, 51, 52 and 53. Pulses e, f, g and h respectively shown in FIGS. 5(E), 5(F), 5(G) and 5(H) from terminals G1, G2, G3 and G4 of the counter 43 are supplied to the corresponding AND circuits 50, 51, 52 and 53. For this reason, only the AND circuit 50 produces the pulse signal d, and the pulse signal d is supplied to a reset terminal R of an R-S flip-flop 54 so as to reset the flip-flop 54 by a falling edge of the pulse signal d. As a result, a pulse signal m shown in FIG. 5(M) which falls in phase synchronism with the falling edge of the pulse signal d within the time period in which the counted value in the counter 43 is "3" is produced from an output terminal Q of the flip-flop 54 and is supplied to an output terminal 55.

On the other hand, when the counted value in the counter 43 becomes "1", a pulse from a terminal P1 of the counter 43 is passed through an OR circuit 56 and is supplied to the stop terminal STP of the counter 45 so as to stop the counting operation of the counter 45. Thus, the counter 45 counts the incoming clock pulses only for a first time period t1 from a time when the rising edge of the pulse a is received to a time when the rising edge of the pulse c immediately after the rising edge of the pulse a is received. Time periods in which the counter 45 performs the counting operation are indicated as high level periods in FIG. 5(J). Then, when the counted value in the counter 43 becomes "2", a pulse k shown in FIG. 5(K) from a terminal P2 of the counter 43 is supplied to a store terminal ST of the latch memory 46 as a store signal so as to store the counted value in the counter 45 during the first time period t1 into the latch memory 46.

The falling edge of the pulse signal d when the counted value in the counter 43 is "3" corresponds to a time when the rotary head HS1 reaches the position where the magnetic tape 16 begins to make contact with the rotary drum 12. Hence, when the rotary drum 12 rotates an angle of 42° from this position, the rotary head HL1 reaches the position where the magnetic tape 16 begins to make contact with the rotary drum 12. As described before, the time $t_{FG}$ that is required for the counted value in the counter 43 to change from one value to another value corresponds to the time it takes for the rotary drum 12 to rotate an angle of 6°. Hence, the counted value in the counter 43 changes by "7" when the rotary drum 12 rotates the angle of 42°, A pulse signal l shown in FIG. 5(L) is outputted from a terminal P6 of the counter 43 when the counted value in the counter 43 becomes "6". This pulse signal l is passed through an OR circuit 57 and is supplied to a load terminal LD of the counter 45 so that the counted value in the first time period t1 stored in the latch memory 46 is loaded into the counter 45. Thereafter, when the counted value in the counter 43 becomes "7", a pulse from a terminal P7 of the counter 43 is passed through the OR circuit 47 and is supplied to the start terminal STT of the counter 45. As a result, the counter 45 starts to count the incoming clock pulses from the loaded counted value in the first time period t1, and produces an overflow signal j from the overflow terminal OF after performing the counting operation for a second time period $t_{FG}$–t1 as shown in FIG. 5(J).

The overflow signal j is passed through the OR circuit 48 and is supplied to the trigger terminal T of the monostable multivibrator 49 so as to trigger the monostable multivibrator 49. As a result, the monostable multivibrator 49 produces the pulse signal d shown in FIG. 5(D) which rises when the counted value in the counter 43 is "7" and falls when the counted value in the counter 43 is "10". The pulse signal d is passed through only the AND circuit 52 and is supplied to a reset terminal R of an R-S flip-flop 58. The flip-flop 58 is reset by the falling edge of the pulse signal d supplied to the reset terminal R thereof. Accordingly, a pulse signal n shown in FIG. 5(N) which has a low level in a time period in which the counted value in the counter 43 is "10" is produced from an output terminal Q of the flip-flop 58 and is supplied to an output terminal 59. In other words, the rotary head HL1 is at the position where the magnetic tape 16 begins to make contact with the rotary drum 12 when the level of the pulse signal n becomes low.

Next, a pulse signal is outputted from a terminal P29 of the counter 43 when the counted value in the counter 43 becomes "29". The pulse from the terminal P29 is passed through the OR circuit 57 and is supplied to the load terminal LD of the counter 45 so that the counted value in the first time period t1 stored in the latch memory 46 is again loaded into the counter 45. When the counted value in the counter 43 becomes "30", a pulse from a terminal P30 of the counter 43 is passed through the OR circuit 47 and is supplied to the start terminal STT of the counter 45 so as to start the counting operation of the counter 45. The counter 45 produces an overflow signal j from the overflow terminal OF thereof when the clock pulses are counted for the time period $t_{FG}$–t1. The monostable multivibrator 49 is triggered by this overflow signal j and produces the pulse signal d shown in FIG. 5(D). Since the pulse signal d is produced in a time period in which the counted value in the counter 43 is "30" to "33", only the AND circuit 51 passes the pulse signal d and supplies the pulse signal d to a set terminal S of the flip-flop 54. As a result, the flip-flop 54 produces from the output terminal Q thereof the pulse signal m which rises in phase synchronism with the falling edge of the pulse signal d in the time period in which the counted value in the counter 43 is "33". The rising edge of the pulse signal m corresponds to a position on the rotary drum 12 which is rotated by one-half revolution from a position on the rotary drum 12 corresponding to the falling edge of the pulse signal m, and this pulse signal m is produced through the output terminal 55 as a head switching signal for the rotary heads HS1 and HS2.

Next, when the counted value in the counter 43 becomes "36", the counted value stored in the latch memory 46 is similarly loaded into the counter 45 responsive to the pulse outputted from a terminal P36 of the counter 43. As shown in FIG.5(J), the counter 45 performs the counting operation for the time period $t_{FG}$–t1 from a time when the counted value in the counter 43 becomes "37", and then produces the overflow signal j so as to trigger the monostable multivibrator 49. Accordingly, the output pulse signal d of the monostable multivibrator 49 is passed through only the AND circuit 53 and is supplied to a set terminal S of the flip-flop 58. Thus, the pulse signal n which rises in phase synchronism with the falling edge of the pulse signal d within the time period in which the counted value in the counter 43 is "40" as shown in FIG. 5(N) is obtained from the output terminal 59. The rising edge of the pulse signal n corresponds to a position where the rotary drum 12 has rotated exactly one-half revolution from the falling edge of the pulse signal n. The pulse signal n is used as a head switching signal for the rotary heads HL1 and HL2.

The operations described heretofore are repeated for every one revolution of the rotary drum 12.

The timings with which the pulses a and the pulses c are supplied to the counter 43 may become inverted due to change with time or the like. For example, when it is assumed that the pulse a is supplied to the counter 43 at a time T1 in FIG.5(A) when the counted value therein is "59", the counter 43 is reset at this time T1 and the counted value therein becomes "0". Immediately after the counter 43 is reset, the counted value in the counter 43 becomes "1" at a time when the pulse c is received. Accordingly, the counted values in the counter 43 respectively become greater than those shown in FIG. 5(B) by one. For this reason, according to the second conventional method described before, the monostable multivibrator 49 would be triggered at a time T2 when the counted value in the counter 43 becomes "30", and the timing of the head switching signal will be shifted by one period of the pulses c.

On the other hand, according to the present embodiment, a counted value indicating a time t3 from the time T1 to the time immediately thereafter when the pulse c is received is stored in the latch memory 46. This counted value stored in the latch memory 46 is used as an initial value of the counter 45, and the counter 45 starts to perform a counting operation at the time T2 when the counted value in the counter 43 becomes "30". The counter 45 produces the overflow signal j at a time T3 which is a time t2 (= $t_{FG}$–t3) after the time T2, and this overflow signal j is used to trigger the monostable multivibrator 49. Therefore, according to the present embodiment, the monostable multivibrator 49 is triggered at the time T3 corresponding to exactly one-half revolution of the rotary drum 12 from the time T1 when the pulse a is supplied to the counter 43, and the timing of the head switching signal will not be shifted by one period of the pulses c as in the case of the conventional method.

According to the present embodiment, it is possible to produce a head switching signal having a polarity which is accurately inverted for every one-half revolution of the rotary drum 12, even when the phase relationship of the pulses a and c is arbitrarily selected. For this reason, it is unnecessary to control the mounting positions of the frequency generator and the rotational phase detector. In addition, since the rotational phase detector simply needs to produce one pulse a for every one revolution of the rotary drum 12, it is sufficient to provide only one magnet 20 on the rotary plate 19. This means that it is only necessary to adjust the mounting position of this one magnet 20 with respect to the rotary heads, and the time it takes to perform the adjustment is considerably reduced compared to the conventional method.

The present invention is not limited to the embodiment described heretofore, and the angle by which the rotary heads HL1 and HL2 respectively lag the rotary heads HS1 and HS2 is not limited to 42°. Furthermore, the number of rotary heads is not limited to four, and it is possible to apply the present invention when there is at least one pair of mutually confronting rotary heads mounted on the rotary drum.

Further, the present invention is not limited to these embodiments, but various variations and modifications may be made without departing from the scope of the present invention.

What is claimed is:

1. A head switching signal producing circuit which produces a head switching signal used to switch over signals reproduced from a magnetic tape by at least one pair of rotary heads which are mounted at diametrical positions on a rotational plane of a rotary body, said rotary body being wrapped obliquely with the magnetic tape on an outer periphery thereof for an angular range greater than 180°, said signals from the rotary heads being switched over so that the signal from one of the rotary heads which is scanning the magnetic tape is selectively outputted, said head switching signal producing circuit comprising:

input terminal means supplied with clock pulses;
    first pulse generating means for generating a first pulse per one revolution of the rotary body;
    second pulse generating means for generating a constant number of second pulses per one revolution of the rotary body, said second pulses having a period dependent on a rotational speed of the rotary body;
    first counter means reset by said first pulse for counting said second pulses;
    second counter means reset by an output of said first counter means for every one revolution of the rotary body for counting the clock pulses from said input terminal means for a first time period from a time when said first pulse is received to a time immediately thereafter when one of said second pulses is received by said first counter means, and for resuming a counting operation when a counted value in said first counter means becomes a predetermined value so as to produce an overflow signal after the clock pulses are counted for a second time period, said second time period being one period of said second pulses minus said first time period;
    memory means coupled to said second counter means for storing a counted value in said second counter means during said first time period, the counted value in said memory means being read out and loaded into said second counter means before the counted value in said first counter means becomes said predetermined value;
    delay circuit means for producing a signal which is delayed by a specific time from a time when said first pulse or said overflow signal is received; and
    output circuit means coupled to said delay circuit means for producing as said head switching signal a signal having a polarity thereof inverted every time an output signal of said delay circuit means is received.

2. A head switching signal producing circuit as claimed in claim 1 in which said first pulse generating means comprises a single magnet mounted on a rotary plate which rotates unitarily with said rotary body and a magnetic head arranged at a height position identical to that of said rotary plate for producing said first pulse every time said single magnet confronts said magnetic head.

3. A head switching signal producing circuit as claimed in claim 2 in which said magnetic head is arranged within an angular range of 15°±10° from a position where the magnetic tape begins to make contact with the outer periphery of said rotary body in a plan view of said rotary body, and said magnet is positioned in phase with one of said rotary heads.

4. A head switching signal producing circuit as claimed in claim 1 in which said delay circuit means comprises an OR circuit supplied with said first pulse and said overflow signal and a monostable multivibrator triggered by an output signal of said OR circuit for supplying a delayed signal to said output circuit means.

5. A head switching signal producing circuit as claimed in claim 1 in which said output circuit means comprises a pair of AND circuits for passing the output signal of said delay circuit means responsive to an output of said first counter means at respective phase addresses of the rotary body, and a flip-flop circuit set by an output of one of said AND circuits and reset by an output of another of said AND circuits for producing an output signal thereof as said head switching signal.

6. A head switching signal producing circuit as claimed in claim 1 in which said output circuit means produces a number of head switching signals corresponding to a number of pairs of said rotary heads, said output circuit means comprising a number of pairs of AND circuits corresponding to the number of said rotary heads for passing the output signal of said delay circuit means responsive to an output of said first counter means at respective phase addresses of the rotary body, and a number of flip-flop circuits corresponding to the number of said rotary heads, each of said flip-flop circuits being set by an output of one of a corresponding pair of said AND circuits and reset by an output of another of the corresponding pair of said AND circuits and producing an output signal thereof as the head switching signal for a corresponding pair of rotary heads out of said rotary heads.

* * * * *